UNITED STATES PATENT OFFICE.

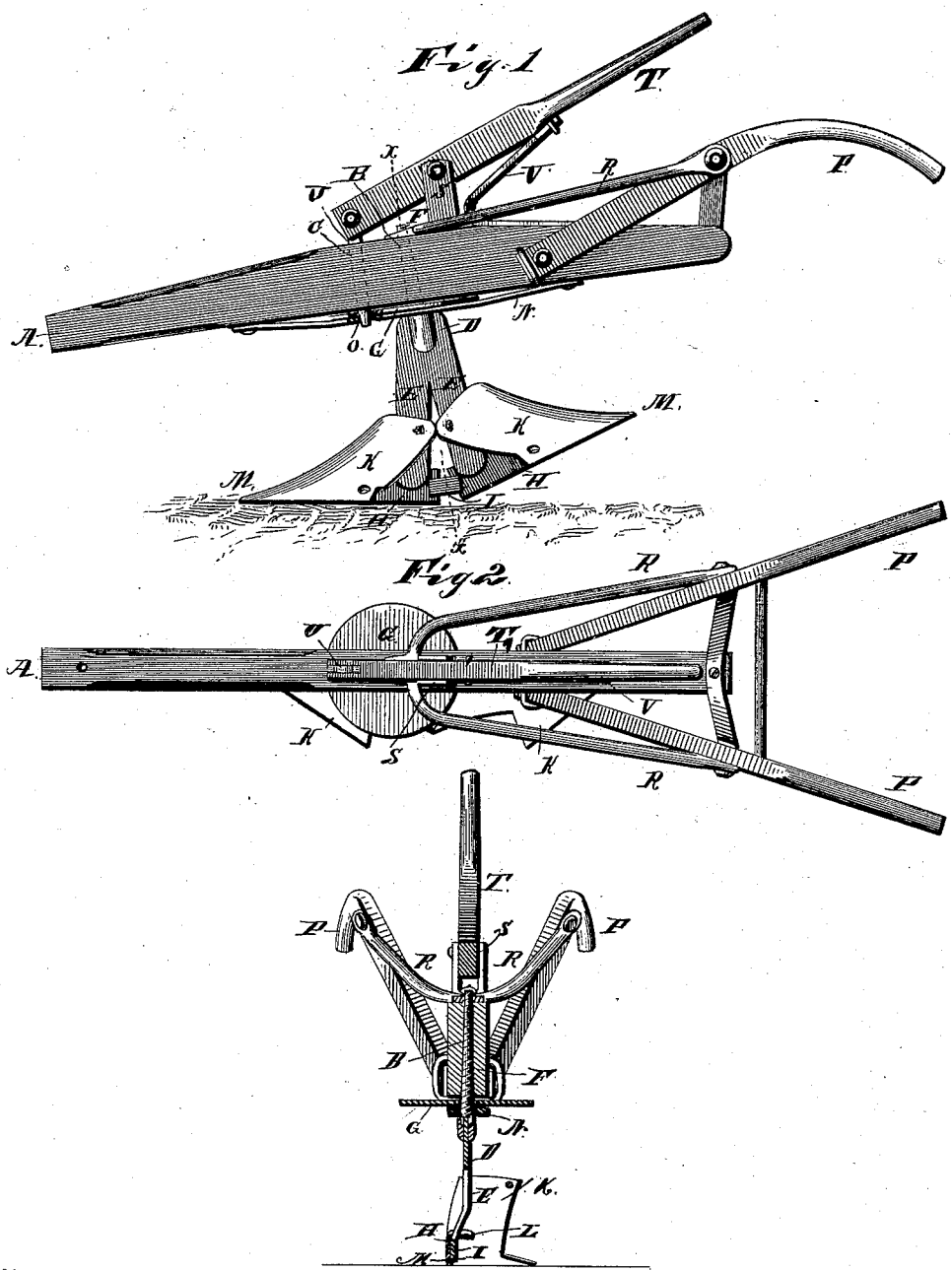

ALBERT KING SNODGRASS, OF ELLENSBURG, OREGON.

SIDE-HILL PLOW.

SPECIFICATION forming part of Letters Patent No. 383,997, dated June 5, 1888.

Application filed August 23, 1887. Serial No. 247,665. (No model.)

*To all whom it may concern:*

Be it known that I, ALBERT KING SNODGRASS, a citizen of the United States, residing at Ellensburg, in the county of Curry and State of Oregon, have invented a new and useful Improvement in Side-Hill Plows, of which the following is a specification.

My invention relates to an improvement in hillside-plows; and it consists in the peculiar construction and combination of devices that will be more fully set forth hereinafter, and particularly pointed out in the claim.

In the accompanying drawings, Figure 1 is a side elevation of a hillside-plow embodying my improvements. Fig. 2 is a top plan view of the same. Fig. 3 is a vertical transverse sectional view, taken on the line $x\,x$ of Fig. 1.

A represents the plow-beam, which is of suitable length and is adapted at one end for the attachment of a clevis of the usual construction. Near the center of the plow-beam is a vertical opening, B, which extends through the same, and at a suitable distance in front of the said opening is a similar opening, C.

D represents a double plow-standard comprising a pair of downwardly-diverging arms, E, having their lower ends bent laterally, as shown in Fig. 3, and a vertical pivotal bolt, F, which projects upward from the said arms and is adapted to enter the opening B in the beam.

G represents a circular disk, which is rigidly secured to the pivotal bolt near the lower end thereof. To the lower ends of the arms E are attached a pair of landsides, H, which are arranged in line with each other and extend in opposite directions, the said sides having their lower edges arranged at a suitable angle with relation to each other, as shown, so that when the lower edge of one of the landsides is in the bottom of a furrow the other landside will be supported in an elevated position out of contact with the soil. The rear opposing ends of the landside-plates are connected together by means of a link-plate, I.

K represents a pair of mold-boards, which are exactly similar in size and shape, but are arranged in reverse positions, each of the said mold-boards being attached to one of the landsides and one of the arms E. The outer ends of the mold-boards meet and are secured together, as shown. The inner sides of the mold-boards are connected to the landside-plates by means of curved yokes or arms L. At the lower edge of each mold-board is attached a point or share, M, the said shares having their inner edges attached to the outer ends of the landside, as shown.

N represents a metallic strap provided with a central opening through which the pivotal bolt F extends. The ends of the said strap are bolted to the under side of the plow-beam. At a suitable distance in front of the central opening in the strap is an opening, O, with which the diametrically-opposite openings in the disk G successively register as the said disk is rotated when the plows are turned and reversed.

P represents a pair of plow-handles, which are attached to the rear end of the beam in the usual manner, and R represents a pair of brace-rods, which have their front ends united and secured on the upper end of the pivotal bolt F and their rear ends bolted to the outer side of the plow-handles.

S represents a U-shaped clip, which is secured to the upper side of the plow-beam at a suitable distance in rear of the pivotal bolt, and between the arms of said clip is fulcrumed the hand-lever T, which extends rearwardly to within a suitable distance of the rear ends of the plow-handles. To the front end of this lever is pivoted an engaging-bolt, U, which extends downward through the opening C, and is adapted to pass through one of the openings in the disk G and through the opening O in the strap, and thereby prevent the standard carrying the plowshares from rotating. A spring, V, bears between the plow-beam, and the lever T serves to raise the rear end of the lever, so as to keep the locking-bolt U in its normal position. (Shown in Fig. 1.)

The operation of my invention will be very readily understood.

At the end of each furrow the plow is turned and the plowshares reversed, so as to cause all of the furrows to be turned in the same direction. When plowing on level ground, the plows may be turned so as to cause the furrows to be thrown either to the right or to the left, as may be desired.

Having thus described my invention, I claim—

The combination, in a side-hill plow, of the beam, the vertical bolt F, extending through the same and adapted to rotate therein, the diverging standard-arms E, depending from the lower end of said bolt and having their upper ends united, the plows having their landside-plates attached to the said standard-arms and extending in opposite directions, said plows having their soles or lower edges arranged at an obtuse angle, the link-plate I, connecting the opposing ends of the said landside-plates, the outer upper corners of the mold-boards in contact and bolted together, and means to lock the revolving standard to the beam, substantially as specified.

In testimony that I claim the foregoing as my own I have hereto affixed my signature in presence of two witnesses.

ALBERT KING SNODGRASS.

Witnesses:
JAMES E. COLLINS,
W. GAUNTHER.